April 8, 1958  A. W. SADDINGTON  2,829,773
METHOD OF CLARIFYING ALGINIC LIQUOR
Filed June 7, 1955
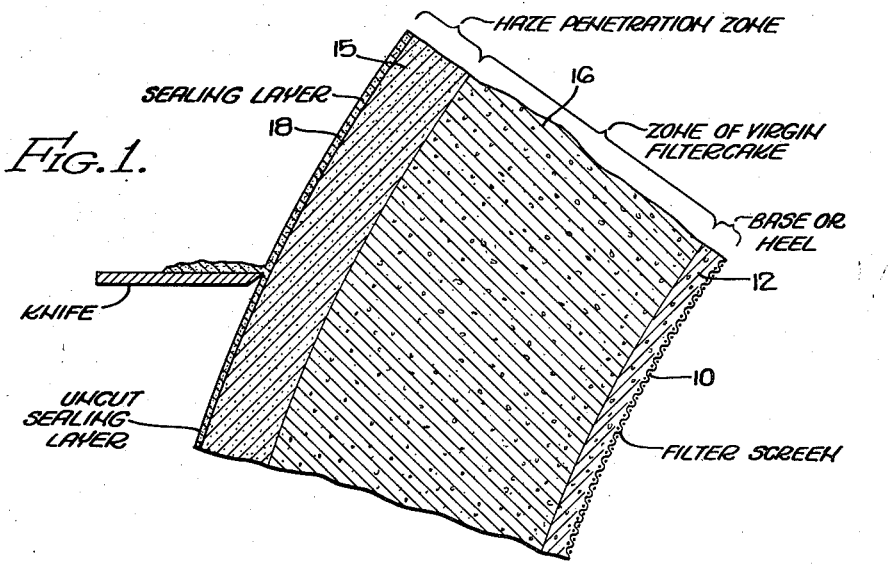
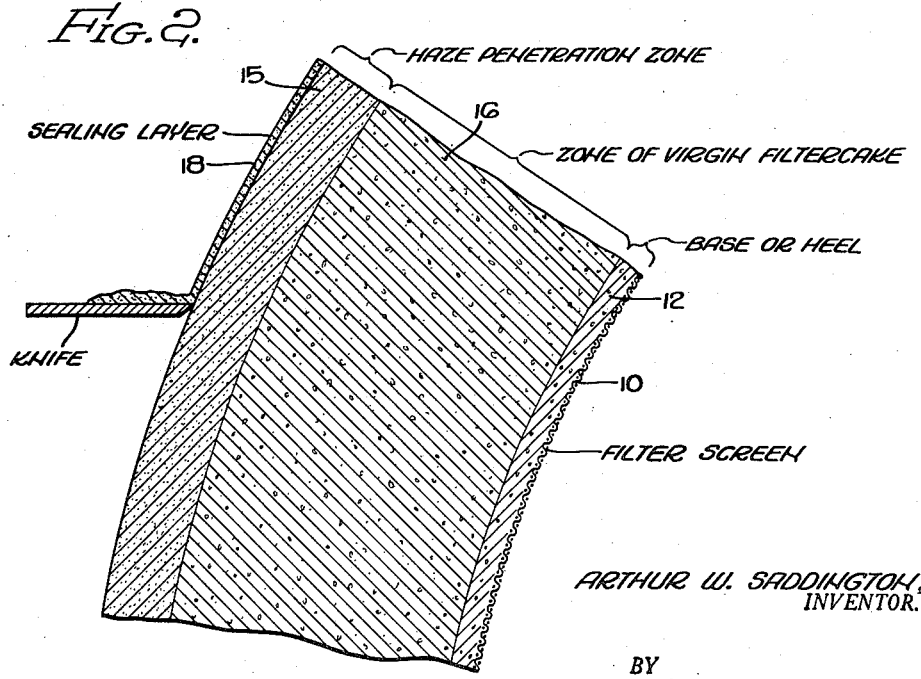
ARTHUR W. SADDINGTON,
INVENTOR.
BY
ATTORNEY 2,829,773
Patented Apr. 8, 1958

2,829,773
METHOD OF CLARIFYING ALGINIC LIQUOR

Arthur W. Saddington, La Mesa, Calif., assignor to Kelco Company, San Diego, Calif., a corporation of Delaware Application June 7, 1955, Serial No. 513,818

21 Claims. (Cl. 210—75)

This invention relates to the production of alginate products from kelp and is directed particularly to the final clarification of an alginate liquor containing finely divided cellulose together with exceedingly fine haze particles.

The invention has special utility for the polishing of an alginate liquor produced by the method disclosed in the copending Saddington et al. application Serial No. 480,978 filed on or about January 10, 1955, now Patent No. 2,742,423, entitled Method of Clarifying Crude Solutions of Alginates, which disclosure is hereby incorporated in the present application by reference. In carrying out this method, chopped kelp is macerated and then digested with a dilute aqueous solution of a mild alkali as, for example, sodium carbonate. The product of this digestion is a viscous aqueous solution of the reaction product, sodium alginate, holding in suspension the finely divided cellulose resulting from the breaking down of the kelp structure.

The major portion of the suspended cellulose particles is removed in a continuous process comprising two stages, each stage separating a portion of the cellulose by flotation and subsequently separating an additional portion of the cellulose by sedimentation. The flotation and sedimentation muds from the first stage are diluted for processing in the second stage and the liquor from the second stage is recycled through the first stage. The primary liquor from the first stage is a mucilaginous alginate solution containing a residual quantity of the finely divided cellulose together with certain exceedingly fine "haze" particles and it is the broad object of the present invention to provide a filtration means and method for final clarification of this liquor.

It is not difficult to filter out the residual cellulose particles. The problem to which the invention is directed is not only to remove the cellulose particles but at the same time to remove all the haze particles to produce a polished or completely clarified liquor at a high rate of production. In general, the invention solves this problem by means of a filter aid composed of particles of vesiculated perlitic mineral, in which the particles are preponderantly smaller in size than taught by the prior art.

The prevailing methods for completely clarifying or polishing a viscous solution, as exemplified by the sugar industry for example, employ diatomaceous earth and diatomaceous earth has heretofore been used on a large scale in leaf-type or plate-and-frame filters for polishing the alginate liquor produced by the above-described process.

Vesiculated perlite has been used for filtration heretofore but has not been found capable of removing the haze particles from the viscous alginate solution. In general the choice of a filter aid must take into consideration the desirability of a high rate of flow, on the one hand, and the desirability for clarification on the other hand. Typically, the choice of a filter aid represents a compromise between these two considerations since a high rate of flow is usually attained at the cost of reduced clarity of the filtrate and a high degree of clarity is attained at the cost of a low rate of production. This concept of compromise between conflicting considerations is set forth, for example, in the Bollaert et al. Patent 2,665,813 which issued January 12, 1954.

The Bollaert patent teaches the use of perlite as a filter aid in situations where a high flow rate is more important than crystal clarity of the filtrate. In the procedure disclosed in the patent the filter cloths of a plate-and-frame press are precoated with diatomaceous earth filter aid at the rate of 0.1 pound per square foot and the perlitic filter aid is added in suspension in the feed liquor in various proportions ranging from 0.02 pound to 0.05 pound per gallon, i. e., from 1.0 to 2.5 pounds per 50 gallons. The standard for comparison is the conventional filtration procedure in which diatomaceous earth is used as a filter aid for addition to the feed liquor and is additionally used as a precoat on the filter cloths. As would be expected in accord with the generally accepted concept of compromise between conflicting considerations, the gain in rate of flow of the filtrate obtained by the substitution of the perlite in the feed liquor is at the cost of clarity, the filtrate being appreciably less clear than the filtrate produced by the standard use of diatomaceous earth alone.

The present invention teaches that perlitic filter aid can be employed to result in a substantial increase in filtrate flow in comparison with the procedure using diatomaceous earth and surprisingly to result at the same time in a filtrate with the same crystal clarity as produced by the standard diatomaceous earth filtration procedure.

The invention is based on certain interrelated discoveries. One discovery is that the desired result of higher filtrate flow of crystal clarity may be obtained by using a filter aid of particles of a vesiculated perlitic mineral in which the particles are of smaller average size than heretofore employed. Another discovery is that the desired result may be attained by using the finely divided perlite as a relatively heavy precoat with provision for periodically cutting away a thin layer to expose fresh precoat surfaces.

In the preferred practice of the invention a rotary type filter apparatus is employed in which the perlite precoat is deposited on a rotary cylindrical screen with a vacuum maintained inside the cylindrical screen to create a pressure differential for forcing the liquor through the precoat. The rotating cylindrical screen is immersed in the feed liquor and a blade mounted adjacent the rotating screen is advanced continuously to remove a thin surface layer of the filter precoat together with the particles deposited by the feed liquor.

Another discovery is that the occurrence of troublesome cracks in such a rotary precoat may be solved by depositing the precoat on a base layer of relatively coarse solid particles, preferably coarse perlite particles. When such cracks occur in the precoat the rotary screen carrying the precoat is exposed to the fresh feed liquor and the fine gelatinous particles in the feed liquor quickly smear and clog the screen. The result is not only the passage of unfiltered liquor through the precoat but also drastic reduction of the flow rate.

A still further discovery involved in the preferred practice of the invention is that the addition to the feed liquor of perlite filter aid of the same general character, i. e., perlite filter aid composed mostly of relatively fine particles, results in a greater rate of filtrate flow as well as longer operating cycles.

In the prior use of a perlite filter aid as exemplified by the Bollaert patent, the particle size distribution is such that 35 to 75% by weight of the particles will pass through a #100 U. S. series screen, 30 to 60% of the particles will pass through a 150 mesh screen and 10 to 25% of the particles will pass through a 325 mesh screen. To keep the proportion of the finest particles within the desired range of 10 to 25% by weight it is usually necessary to discard by screening or air-clarifying a proportion of the finest dust-like particles found in a furnace run of perlite.

According to the patent, the loose weight of the perlite and the proportion of the perlite that will float on water are both additional guides for selecting particle sizes. There is a certain correlation between particle size and both the loose weight and the proportion of particles that will float because the larger particles have unbroken vesicles and the smaller particles are largely fragments of vesicle walls that tend to sink in water. The intent expressed in the patent is to avoid an undue proportion of the fine vesicle wall fragments and to this end it is stated that the loose weight of the filter aid will ordinarily range between 3 and 4.5 pounds per cubic foot and that the proportion of particles lighter than water will ordinarily range from 50% to 75% by weight.

In contrast, the present invention seeks a higher proportion of the fine vesicle wall fragments. The desired loose weight per cubic foot exceeds 5 pounds and is preferably approximately 6 pounds. Ordinarily a minor portion instead of a major portion of the particles of the new filter aid float on water and preferably the mix is such that approximately 30% by weight or less of the particles float on water. As hereafter pointed out, however, the density of the perlite particles with respect to flotation on water is not a controlling factor.

The desired particle size distribution may be distinguished over prior practices in various ways. One generalization that may be followed is that more than 60% by weight of the particles of the new perlite mix will pass through a #150 U. S. series screen. Preferably this percentage is on the order of 70%. Another and alternate generalization is that 75% by weight of the new filter aid mixture will pass through a #100 U. S. series screen. Preferably this percentage is more than 80%. In one successful mix, for example, 84% by weight of the particles passed through a 100 mesh screen. Instead of a range of 10 to 25% by weight of the particles passing through a #325 U. S. series screen it is contemplated that a minimum on the order of 25% will pass through this screen and this percentage may be much higher, for example, 40%. These screen size analyses and those hereinafter referred to are based on a wet screen analysis.

One mixture of perlite particles tested for a typical practice of the invention comprised the following:

| Mesh Size | Percentage of Mixture | Density, Grms./cc. | Percentage by Weight Floating on Water |
|---|---|---|---|
| Through #60 on #100 | 19 | .062 | 75 |
| Through #100 on #150 | 11 | .088 | 38 |
| Through #150 on #325 | 45 | .121 | 7.2 |
| Through #325 | 25 | .210 | 1.8 |
| Whole Mix | 100 | .114 | 49 |

This mixture of finely divided perlite used as a precoat without the addition of filter aid to the feed liquor resulted in a filtrate flow of 28 gallons/square feet precoat/per hour. This rate is substantially higher than the rate of flow that can be obtained with the use of diatomaceous earth alone and the resulting filtrate is crystal clear.

The basic fact that the unexpected results obtained with the above mix depends upon the preponderance of the finer classifications of vesicular fragments has been borne out by tests in which the different classifications were isolated for filtration runs. Using a precoat consisting entirely of perlite particles small enough to pass through a 325 mesh screen resulted in crystal clarity at a rate of filtrate flow of 30.5 gallons/square feet precoat/hour or an increase of approximately 9% over the production rate of 28 gallons/square feet precoat/hour obtained with the whole mix. Using a precoat consisting entirely of perlite particles passing through a 150 mesh screen and retained on a 325 mesh screen resulted in a flow of crystal clear filtrate at the surprisingly high rate of 42.5 gallons/square feet/hour. When each of the other two coarser fractions were used, the flow rate dropped drastically because suspended particles in the solution passed all the way through the precoat to clog the underlying screen. The 100–150 classification lowered production to 14 gallons/square feet precoat/hour and the 60–100 classification dropped production still lower to 7 gallons/square feet precoat/hour.

It is apparent from the foregoing results that the present invention may be practiced by using the smaller classifications exclusively. Thus a rate of flow of crystal clear filtrate exceeding the rate obtainable with diatomaceous earth may be obtained by using exclusively perlite particles that pass through a 325 mesh screen and even higher production can be obtained by using exclusively perlite particles that pass through a 150 mesh screen and are retained on a 100 mesh screen. Both of these classifications are covered by the previously given generalization that more than 60% by weight of the particles pass through a 150 mesh screen; and both classifications also satisfy the alternate generalization that more than 75% by weight of the filter aid particles pass through a 100 mesh screen.

The foregoing results clearly show that the float test alone is not a reliable guide as to the efficiency of a perlite filter aid for the present purpose of polishing a mucilaginous liquor. As indicated in the above tabulation, less than 2% by weight of the particles of the smallest classification float on water and less than 8% by weight of the next smallest classification float on water.

To verify the conclusion that density alone is not a controlling factor, a mixture of perlite particles was selected for separation into two grades by flotation. The resulting lighter faction of perlite particles had a density of 0.09 gram/cc. and the heavier faction had a density of 0.14 gram/cc. The particle sizes of both factions satisfied the new requirements since 90% by weight of the light faction and 75% by weight of the heavier faction passed through a 150 mesh screen. Both of the factions used as precoats produced crystal clear filtrate at flow rates exceeding 28 gallons/square feet precoat/hour.

The success of the present invention in the clarification of the designated alginate solution involves the following factors and considerations:

(1) Perlite being a form of glass tends to fracture with sharp, jagged edges and the vesicular perlite fragments as produced at high temperature by a continuous furnace process have especially sharp and jagged edges.

(2) The depositing of perlite particles in a random manner to form a precoat layer results in the formation of filtration channels lined with numerous sharp, jagged edges that are especially effective for snagging or trapping particles of gelatinous character such as the haze particles in the alginate solution. This effectiveness is increased by the tortuous or zig-zag configuration of the filtration passages resulting from the random positioning of the perlite particles in the precoat.

(3) A haze particle in the feed liquor must pass numerous such sharp, jagged edges in moving through one of the tortuous filter channels and the probability that the particle will be snagged or trapped will depend on the length of the passage and the size in cross section of the passage relative to the size of the haze particle. In the case of the particular haze particles that characterize the alginate solution, the use of a perlite filter precoat of sufficient fineness raises this probability to a practical certainty that all of the haze particles will be stopped within in a given depth of penetration. This depth may be aptly termed the haze penetration zone of the precoat. In using a particle size distribution such as in the previously mentioned mix that produced a flow rate of 28 gallons/square feet precoat/hour, the depth of the haze penetration zone is found to be on the order of ¾ inch. The haze penetration zone is clearly apparent as a discolored layer and may be ascertained by slicing a portion of the precoat in the coarse of a filtration run.

(4) A filter coat of preponderantly fine perlite particles may be maintained continuously effective for the present purpose by periodically removing a surface layer, for example, by continuously advancing a knife edge against a perlite precoat on a rotating cylindrical screen. In such a method of operation the haze penetration zone where the haze particles are entrapped is maintained at substantially constant depth, for example, a depth of ¾ inch. In effect, this haze penetration zone shifts inwardly by the depth of the knife cut on each rotation of the filter cylinder. Thus with a knife cut of .005 inch, a layer of .005 inch thickness at the bottom of the haze penetration zone, in effect, progresses outward through the haze penetration zone in 0.75/.005 or 150 revolutions of the cylindrical screen.

The "haze-density" of such an outwardly progressing thin layer, i. e., the number of haze particles trapped therein, progressively increases by the accretion of a shower of haze particles on each revolution of the rotary screen as the knife exposes a fresh surface of the precoat, the increase in haze-density being accelerated as the thin layer approaches the exposed surface of the precoat. The average or overall haze-density of the ¾ inch haze penetration zone rises during an initial build-up period of 150 revolutions of the rotary precoat and thereafter remains constant under steady state conditions. To state the same fact in terms of permeability, the porosity of the .005 inch layer progressively decreases at an accelerated rate as the layer progresses to the surface of the precoat and the overall porosity of the haze penetration zone decreases during the preliminary stage of the filtration cycle and thereafter remains constant.

The choice of depth of knife cut involves a number of considerations. On the one hand, it is apparent that the greater the depth of cut, the shorter the initial period of density build-up in the haze penetration zone to establish the steady state condition, and up to a certain point, the deeper the cut the greater the rate of filtrate flow. This point of diminishing returns is determined primarily by the depth of penetration into the precoat of what may be conveniently termed a sealing layer that is created by the exposure of a freshly cut precoat surface to the onslaught of the feed liquor with the consequent deposit of cellulose particles thereon.

If the newly exposed surface of the precoat is relatively porous, that is to say, if the density of the surface layer of the haze penetration zone has not been built up substantially by entrapped haze particles, the sealing layer will extend well below the surface of the precoat since the larger gelatinous cellulose particles deposited by the feed liquor will penetrate the filter cake with a clogging action that tends to seal off the flow of filtrate. On the other hand, if the exposed surface of the precoat is only sufficiently porous to admit the haze particles, the sealing layer will be at the surface of the precoat without substantial penetration into the haze penetration zone.

Since the depth of penetration of the sealing layer into the precoat depends upon this haze-density of the haze penetration zone and since the haze-density is zero at the beginning of a filtration cycle, the sealing layer initially extends relatively deeply into the body of the precoat. As the filtration cycle proceeds through the previously mentioned preliminary build-up period, the sealing layer lessens in thickness and recedes towards the surface of the haze penetration zone. Thereafter the sealing layer remains constant with reduced penetration into the surface of the precoat during the steady-state operation of the filter.

In the drawing:

Fig. 1 is a diagrammatic cross-section of a rotary precoat of the invention during the preliminary build-up stage of a filtration cycle; and Fig. 2 is a similar diagram showing the precoat in the subsequent steady-state stage of the cycle.

The perlite precoat shown in the drawing is of the previously specified particle size distribution and is deposited on a cylindrical stainless steel screen 10 of mesh that is 8 feet in diameter and rotates, for example, at approximately 0.7 R. P. M. The interior of the cylindrical screen is maintained under a constant vacuum and the screen is partially immersed in the feed liquor. The perlite precoat, which may have an initial thickness of approximately three inches, includes a base layer or "heel" 12 of coarser particles, this base layer having a thickness on the order of ¼–½ inch.

The material of the base layer 12 may be similar to the body of the precoat but includes a minor percentage of relatively large particles, preferably perlite particles. A satisfactory specification in parts by weight for such a base layer is as follows:

| | |
|---|---|
| Retained on #60 U. S. series screen | 5–10% |
| Through #60 on #100 U. S. series screen | 5–15% |
| Through #100 on #150 U. S. series screen | 10–15% |
| Through #150 U. S. series screen | Balance |

The large particles of the base layer "bridge" across the openings in the stainless steel filter cloth and the variety of smaller sizes cooperate to fill the voids among the larger sizes to the extent required to make a base layer capable of holding back the fine particles of the adjacent body of the precoat.

The body of the precoat has a haze penetration zone 15 as heretofore explained which may be on the order of ¾ inch in depth. The remainder of the body of the precoat is a progressively diminishing zone 16 of virgin filter cake.

Eventually the haze penetration zone 15 attains a steady-state depth on the order of ¾ inch, as heretofore indicated, but the depth is not readily discernible at the start of a filtration cycle and probably is somewhat deeper than ¾ inch during most of the initial build-up period. A sealing layer 18 is created by the onslaught of the feed liquor, as heretofore described, and this sealing layer initially extends to a substantial depth into the haze penetration zone 15 during the build-up period.

Fig. 2 shows the character of the precoat during the subsequent steady state stage of the filtration run. The haze penetration zone 15 is of a steady depth on the order of ¾ inch and the sealing layer 18 has receded in depth of penetration into the precoat to a minimum steady-state dimension.

Since the steady-state period of operation is usually several times longer than the initial build-up period, the depth of knife cut is based on the eventual minimum depth of penetration of the sealing layer 18. Thus the knife may be adjusted to remove the minimum depth sealing layer entirely during the steady-state stage of operation, as shown in Fig. 2, or at least to remove a sufficient portion of the sealing layer to produce an economically high filtration flow, it being borne in mind that the deeper the cut, the shorter the cycle of operation afforded by a precoat of a given starting thickness.

Both Fig. 1 and Fig. 2 show the knife at an optimum adjustment for steady-state operation. Fig. 1 illustrates the fact that the knife at this adjustment leaves intact a substantial portion of the sealing layer 18 during the initial build-up stage of the filtration cycle. As a result there is an initial decrease in the rate of filtration flow and this decrease continues because the haze-density of the haze penetration zone 15 progressively increases to more than offset the progressive reduction in depth of penetration of the sealing layer 18. Thus the rate of filtration flow is observed to drop off during the build-up period to settle at a constant rate for the duration of the subsequent steady-state stage of the filtration cycle.

For a typical filtration run with the alginic solution, the knife may be adjusted, for example, for a cut of .005 inch. If the haze penetration zone under steady-state operation is ¾ inch in depth the build-up stage of the filtration cycle will occur over approximately .750/.005 or 150 rotations of the cylindrical precoat. Thus at 0.7 R. P. M. the build-up period will be on the order of 3½ hours duration and the steady-state operation may continue another 7 hours before the contaminated ¾ inch haze penetration zone reaches the cylindrical screen 10.

The preferred practice of the invention is based on the further discovery that adding to the feed liquor a perlite filter aid of the same general particle distribution as the precoat has the unexpected effect of reducing the depth of the haze penetration zone and of practically eliminating the previously mentioned drop in the flow rate of the filtrate during the initial build-up stage of the cycle. The depth of the haze penetration zone 15 has been found to drop from approximately ¾ inch to approximately ¼ inch.

The addition of the filter aid has an equalizing effect on the porosity of the layer of the precoat that is freshly exposed by the knife. The equalizing effect is caused by the rushing of the feed liquor into the larger of the newly exposed filter channels in a selective manner to build up the channel walls. The liquor-entrained filter aid particles entering the larger filter channels not only reduce the channels in cross-sectional dimension but also divert haze particles into engagement with the jagged edges of the wall particles. In addition the relatively fine perlite particles that are carried into the body of the precoat, cooperate with the haze particles to "bridge" across the larger filtration channels. As a consequence substantially all of even the finest haze particles are trapped within the depth of approximately ¼ inch.

The selective or equalizing action of the relatively fine liquor-entrained perlite particles quickly reduces the porosity of the haze penetration zone at the very start of the build-up period and reduces both the initial depth of the haze penetration zone and the steady-state depth of penetration of the sealing layer 18. Apparently the depth of penetration into the precoat of the sealing layer is roughly in proportion to the depth of the haze penetration zone, since both vary with the effective porosity of the precoat. The liquor-entrained perlite particles that are fine enough to penetrate the precoat decrease the effective porosity of the precoat so promptly that flow during the initial build-up stage is substantially the same as during the subsequent steady-state stage of the cycle. Under these operating conditions the depth of the knife cut may be greatly reduced and the filtration cycle correspondingly lengthened.

The filter aid added to the feed liquor may be in the form of wet cake taken from a previous filtration run, or may be fresh perlite. Within bounds, increasing the amount of filter aid added to the feed liquor reduces the depth of penetration of the sealing layer 18, as heretofore noted, and therefore decreases the depth of cut necessary to remove the sealing layer. Too much filter aid in the feed liquor, however, decreases the porosity of the haze penetration zone to such an extent as to lower the filtration rate to an uneconomical level.

Wet filter cake may be added at the rate of 1 pound to 50 gallons of feed liquor, for example, with the knife cut adjusted at .004 inch. Fresh dry perlite may be added at a rate of 0.5 to 1.0 pounds to 50 gallons of feed liquor with the knife cut adjusted as low as .002 inch to extend the operating cycle to 30 hours. To reduce the cost of filter aid, the addition of the perlite to the feed liquor may be reduced to 0.25 pound to 50 gallons of feed liquor, with the knife adjusted to cut at a depth of .003 inch.

Using perlite filter aid for the rotary precoat and for addition to the feed liquor in accord with the preferred practice of the invention results in a filtration flow rate that is greater by more than 30% than the flow rate that can be obtained by similar use of diatomaceous earth. At the same time, the filter aid consumption in pounds per gallon of filtrate is reduced on the order of 80%. In addition, the cost of handling the filter aid and of making disposal of the used filter aid is greatly reduced. The overall saving in labor and material is on the order of 65% or more.

The success of the invention is based on the discovery that perlite particles with sharp, jagged edges may be used in finer grades than heretofore used to produce greater rates of flow of clear filtrate than can be produced with diatomaceous earth. That sharp, jagged edges are essential is clearly indicated by tests with perlite that has been subjected to severe grinding operation. Severe grinding results in dull particle edges instead of sharp edges and blunt serrations instead of jagged pointed serrations. Such particles are found to be worthless for the purpose of the invention.

The fact that it is the fine gelatinous haze particles rather than the large cellulose particles that enter the haze penetration zone 15 is supported by an experiment with two different sample feed liquors. Both of the samples had the same percent of cellulose content but one was prepared with clear filtrate to reduce the haze content to nearly zero. The absence of haze particles resulted in increased flow rate and, even though no filter aid was added to the feed liquor, there was no initial drop in the rate of filtration flow. The sustained rate of flow of the filtrate indicated that the usual excessive initial penetration of the sealing layer into the filter precoat did not occur.

The unexpected high rate of filtration flow with the 150—325 classification heretofore mentioned and the lesser increase with the —325 classification, clearly indicate that there is some optimum ratio of perlite particle size to haze particle size, at which ratio the jagged filter channels are large enough in cross-section for a high rate of filtrate flow but nevertheless are small enough in cross-section to entrap the haze particles. The invention teaches that this ratio may be at least approached to a profitable degree in the clarification of the alginic liquor by using a furnace run perlite mixture in which more than 60% by weight of the particles will pass through a #150 U. S. series screen or in which more than 75% by weight of the particles will pass through a #100 U. S. series screen.

Our description of selected practices of the invention by way of example and to illustrate the principles involved will suggest various changes, substitutions and other departures from our disclosure that properly lie within the spirit and scope of the appended claims.

I claim:

1. A filter aid for clarifying a concentrated solution of alginate salt produced by a prior digestion of kelp with an aqueous alkaline solution, said filter aid comprising particles of vesiculated perlitic mineral more than 60% by weight of which will pass through a #100 U. S. series screen.

2. A filter aid as set forth in claim 1 in which more than 75% by weight of the particles will pass through a #100 U. S. series screen.

3. A filter aid as set forth in claim 1 in which at least on the order of 25% by weight of the particles will pass through a #325 U. S. series screen.

4. A filter aid as set forth in claim 1 in which said particles have a loose weight of at least 5 pounds per cubic foot.

5. A filter aid as set forth in claim 1 in which not substantially more than 50% by weight of said particles will float on water.

6. A filter aid as set forth in claim 1 in which not more than 30% by weight of the particles will float on water.

7. A filter aid for clarifying a concentrated solution of alginate salt produced by a prior digestion of kelp with an aqueous alkaline solution, said filter aid comprising particles of vesiculated perlitic mineral, more than 60% by weight of which will pass through a #150 U. S. series screen, more than 75% by weight of which will pass through a #100 U. S. series screen, at least on the order of 25% by weight of which will pass through a #325 U. S. series screen, and the loose weight of which is at least on the order of 5 pounds per cubic foot.

8. A filter aid as set forth in claim 7 in which more than 70% by weight of the particles will pass through a #150 U. S. series screen.

9. A filter aid as set forth in claim 8 in which at least on the order of 25% by weight of the particles will pass through a #325 U. S. series screen.

10. In a method of filtering haze particles out of a solution of the character described wherein a filter cake is formed on a filter screen for the forced flow of the solution therethrough, and a layer of said filter cake is periodically removed to expose fresh surfaces thereof to the solution, the improvement which consists in forming the filter cake of particles of vesiculated perlitic mineral, more than 60% by weight of which particles will pass through a #100 U. S. series screen.

11. An improvement as set forth in claim 10, in which more than 75% by weight of said particles will pass through a #100 U. S. series screen.

12. An improvement as set forth in claim 11, in which more than 60% by weight of said particles will pass through a #150 U. S. series screen.

13. The improvement as set forth in claim 12, in which at least approximately 25% by weight of the particles will pass through a #325 U. S. series screen.

14. The improvement as set forth in claim 10, in which said particles have a loose weight of at least 5 pounds per cubic foot.

15. The improvement as set forth in claim 10, in which not more than 50% by weight of said particles will float on water.

16. The improvement as set forth in claim 10, in which at least 5% by weight of the particles used for the base portion of the filter cake are retained on a #60 U. S. series screen.

17. In a method of filtering haze particles out of a solution of the character described, wherein a filter aid is added to enrich the solution, and a filter cake is formed on a filter screen for the forced flow of the enriched solution therethrough, the improvement which consists in using particles of vesiculated perlitic mineral, both for enriching the solution and for forming the filter cake, more than 75% by weight of which particles will pass through a #100 U. S. series screen.

18. The improvement as set forth in claim 17, in which more than 60% by weight of said particles will pass through a #150 U. S. series screen.

19. The improvement as set forth in claim 18, in which at least 25% by weight of said particles will pass through a #325 U. S. series screen.

20. The improvement as set forth in claim 19, in which said particles have a loose weight of at least 5 pounds per cubic foot.

21. The improvement as set forth in claim 17, in which at least 5% by weight of the particles used for the base portion of the filter cake are of a size to be retained on a #60 U. S. series screen.

References Cited in the file of this patent

UNITED STATES PATENTS 1,946,039     Staritzky  ---------------- Feb. 6, 1934

OTHER REFERENCES

Ralston: "Perlite, Source of Synthetic Pumice," Bureau of Mines Information Circular 7364, August 1946, 106–Perlite, 11 pages.